(12) United States Patent
Lee

(10) Patent No.: US 12,500,598 B2
(45) Date of Patent: Dec. 16, 2025

(54) SAMPLE AND HOLD CIRCUIT

(71) Applicant: SK hynix Inc., Icheon-si (KR)

(72) Inventor: Se Won Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 221 days.

(21) Appl. No.: 18/182,071

(22) Filed: Mar. 10, 2023

(65) Prior Publication Data

US 2024/0162913 A1  May 16, 2024

(30) Foreign Application Priority Data

Nov. 15, 2022 (KR) .................. 10-2022-0152977

(51) Int. Cl.
*H03M 1/12* (2006.01)
*H03M 1/18* (2006.01)
*G11C 27/02* (2006.01)

(52) U.S. Cl.
CPC ......... *H03M 1/1245* (2013.01); *H03M 1/183* (2013.01); *G11C 27/02* (2013.01); *G11C 27/026* (2013.01)

(58) Field of Classification Search
CPC ....... H03M 1/1245; H03M 1/83; G11C 27/02; G11C 27/026
See application file for complete search history.

(56) References Cited

U.S. PATENT DOCUMENTS

| | | | |
|---|---|---|---|
| 2008/0094272 A1* | 4/2008 | Horie | H03M 1/1225 341/158 |
| 2014/0070971 A1* | 3/2014 | Zabroda | G11C 27/026 341/122 |
| 2020/0209906 A1 | 7/2020 | Choi et al. | |

FOREIGN PATENT DOCUMENTS

KR          101461328 B1    11/2014

\* cited by examiner

*Primary Examiner* — Joseph J Lauture
(74) *Attorney, Agent, or Firm* — WILLIAM PARK AND ASSOCIATES LTD.

(57) ABSTRACT

A sample and hold circuit includes a sampling circuit including a first amplifier configured to amplify an input voltage to generate an amplification voltage, the sampling circuit configured to perform a sampling operation of sampling the amplification voltage. The sample and hold circuit also includes a holding circuit configured to perform a holding operation of setting an output voltage to a voltage level of the input voltage, based on the sampling operation and an amplification operation of a second amplifier.

13 Claims, 5 Drawing Sheets

FIG.5

|  | PRIOR ART | PRESENT DISCLOSURE |
|---|---|---|
| $\dfrac{VOUT}{VIN}$ | $1 - \dfrac{1}{1+A}$ | $1 - \dfrac{1}{1+2A+A^2}$ |
| ERROR VALUE | $\dfrac{1}{1+A}$ | $\dfrac{1}{1+2A+A^2}$ |
| ERROR RATE AT A=10 | 9.090909 | 0.826446281 |
| ERROR RATE AT A=100 | 0.990099 | 0.00980296 |

SAMPLE AND HOLD CIRCUIT

CROSS-REFERENCE TO RELATED APPLICATION

The present application claims priority under 35 U.S.C. 119(a) to Korean Patent Application No. 10-2022-0152977, filed on Nov. 15, 2022, which is incorporated herein by reference in its entirety.

BACKGROUND

1. Technical Field

Embodiments of the present disclosure relate to sample and hold circuits capable of reducing or minimizing an error rate between an input voltage and an output voltage.

2. Related Art

In recent electronic devices, various converters are used for conversion of analog signals and digital signals. More specifically, the converters used in electronic devices include a digital to analog (D/A) converter that converts a digital signal into an analog signal and an analog to digital (A/D) converter that converts an analog signal into a digital signal.

To sample an analog signal and convert the sampled analog signal into a digital signal, the A/D converter uses a sample and hold circuit to maintain the level of the sampled analog signal in a certain interval.

SUMMARY

In accordance with an embodiment of the present disclosure, a sample and hold circuit includes: a sampling circuit including a first amplifier configured to amplify an input voltage to generate an amplification voltage, the sampling circuit configured to perform a sampling operation of sampling the amplification voltage; and a holding circuit configured to perform a holding operation of setting an output voltage to a voltage level of the input voltage, based on the sampling operation and an amplification operation of a second amplifier.

In accordance with another embodiment of the present disclosure, a sample and hold circuit includes a holding circuit including a second amplifier, the holding circuit configured to perform a holding operation of setting an output voltage to a voltage level of an input voltage. The sample and hold circuit also includes a sampling circuit configured to perform a sampling operation. The sampling circuit includes: a first amplifier generating an amplification voltage by amplifying the input voltage; a first capacitor generating a voltage difference between both ends of the first capacitor, based on the input voltage and a set voltage during a sampling interval in which the sampling operation is performed; and a second capacitor generating a voltage difference between both ends of the second capacitor, based on the amplification voltage and the set voltage during the sampling interval.

BRIEF DESCRIPTION OF THE DRAWINGS

FIG. 5 is a table illustrating an error rate generated in a sample and hold circuit according to an embodiment of the present disclosure.

DETAILED DESCRIPTION

In the following description of embodiments, when a parameter is referred to as being "predetermined," it may be intended to mean that a value of the parameter is determined in advance of when the parameter is used in a process or an algorithm. The value of the parameter may be set when the process or the algorithm starts or may be set during an interval in which the process or the algorithm is executed.

It will be understood that although the terms "first," "second," "third," etc. are used herein to describe various elements, these elements should not be limited by these terms. These terms are only used to distinguish one element from another element and are not intended to imply an order or number of elements. Thus, a first element in some embodiments could be termed a second element in other embodiments without departing from the teachings of the present disclosure.

Further, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Various embodiments of the present disclosure will be described hereinafter in more detail with reference to the accompanying drawings. However, the embodiments described herein are for illustrative purposes only and are not intended to limit the scope of the present disclosure.

Figure 1:
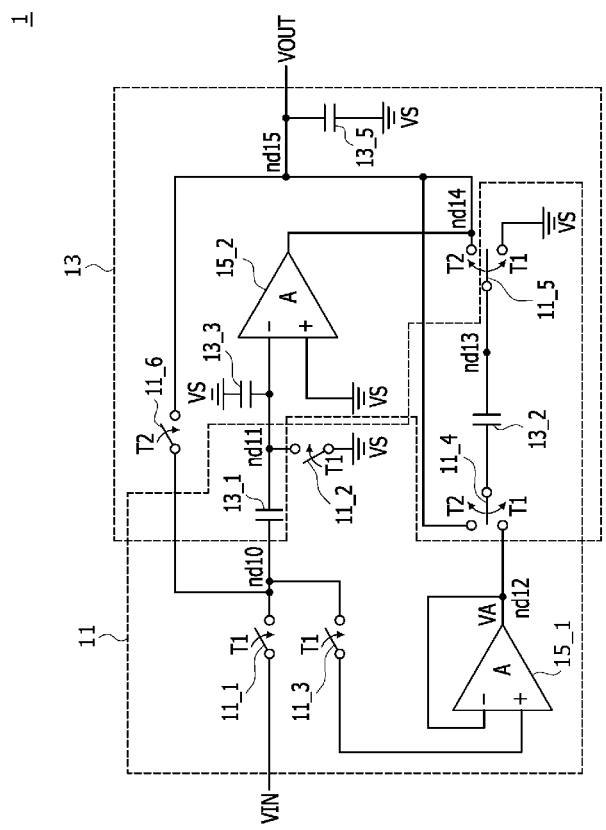
FIG. 1 is a circuit diagram illustrating a sample and hold circuit according to an embodiment of the present disclosure.

FIG. 1 is a circuit diagram illustrating a sample and hold circuit 1 according to an embodiment of the present disclosure. As shown in FIG. 1, the sample and hold circuit 1 may include a sampling circuit 11 and a holding circuit 13.

Figure 4:
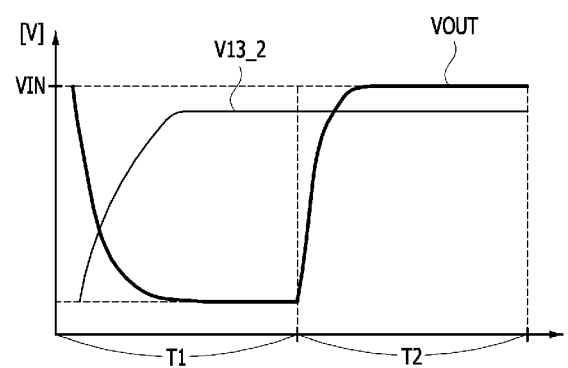
FIG. 4 is a waveform diagram illustrating waveforms of an input voltage and an output voltage of a sample and hold circuit according to an embodiment of the present disclosure.

The sampling circuit 11 may perform a sampling operation of sampling an input voltage VIN and an amplification voltage VA during a sampling interval (T1 in FIG. 4). The sampling circuit 11 may include a first amplifier 15_1, switches 11_1, 11_2, 11_3, 11_4, and 11_5, and capacitors 13_1 and 13_2. Each of the switches 11_1, 11_2, 11_3, 11_4, and 11_5 may perform a switching operation for the sampling operation during the sampling interval (T1 in FIG. 4). The switch 11_1 may be switched so that the input voltage VIN is applied to the capacitor 13_1 through a node nd10 during the sampling interval (T1 in FIG. 4). The switch 11_2 may be switched so that a set voltage VS is connected to a node nd11 during the sampling interval (T1 in FIG. 4). The input voltage VIN that is input through the node nd10 and the set voltage VS that is input through the node nd11 during the sampling interval (T1 in FIG. 4) may be applied to the capacitor 13_1. A voltage difference equal to a difference between the input voltage VIN and the set voltage VS may be generated between both ends of the capacitor 13_1 during the sampling interval (T1 in FIG. 4). For example, when the set voltage VS is set to a ground voltage 0 V, a voltage difference equal to the input voltage VIN may be generated between both ends of the capacitor 13_1. The switch 11_3 may be closed so that the input voltage VIN is input to a positive input terminal '+' of the first amplifier 15_1 during the sampling interval (T1 in FIG. 4). The first amplifier 15_1 may amplify the input voltage VIN by a voltage gain A to output the amplification voltage VA through a node nd12. Because the amplification voltage VA is input to a negative input terminal '−' of the first amplifier 15_1, the amplification voltage VA may be set to a value obtained by dividing a value obtained by subtracting a voltage level of the amplification voltage VA from a voltage level of the input voltage VIN by a voltage gain A. The switch 11_4 may be switched so that the node nd12 is connected to the capacitor 13_2 during the sampling interval (T1 in FIG. 4). The switch 11_5 may be switched so that a node nd13 is connected to the set voltage VS during the sampling interval (T1 in FIG. 4). The amplification voltage VA that is input through the node nd12 and the set voltage VS that is input through the node nd13 may be applied to the capacitor 13_2 during the sampling interval (T1 in FIG. 4). A voltage difference equal to the difference between the amplification voltage VA and the set voltage VS may be generated across the capacitor 13_2 during the sampling interval (T1 in FIG. 4). For example, when the set voltage VS is set to the ground voltage 0 V, a voltage difference equal to the amplification voltage VA may be generated between both ends of the capacitor 13_2.

The holding circuit 13 may perform a holding operation of setting an output voltage VOUT to the voltage level of the input voltage VIN during a holding interval (T2 in FIG. 4), based on a sampling operation and an amplification operation of a second amplifier 15_2. The holding circuit 13 may include the second amplifier 15_2, switches 11_4, 11_5, and 11_6, and capacitors 13_1, 13_2, 13_3, and 13_5. The second amplifier 15_2 may receive the voltage of the node nd11 through a negative input terminal (−) and receive the set voltage VS through a positive input terminal (+) to perform the amplification operation. The switch 11_4 may be switched so that a node nd15 is connected to the capacitor 13_2 during the holding interval (T2 in FIG. 4). The switch 11_5 may be switched so that a node nd13 is connected to a node nd14 during the holding interval (T2 in FIG. 4). During the holding interval (T2 in FIG. 4), when the node nd14 is connected to the node nd13 by the switch 11_5 and the node nd14 is connected between the capacitor 13_2 and an output terminal of the second amplifier 15_2, the voltage of the node nd14 may be set by the output voltage VOUT of the node nd15 and the voltage difference across the capacitor 13_2. For example, when a voltage difference equal to the amplification voltage VA is set across the capacitor 13_2 during the sampling interval (T1 in FIG. 4), the voltage of the node nd14 may be set to a voltage obtained by subtracting the amplification voltage VA from the output voltage VOUT during the holding interval (T2 in FIG. 4). The switch 11_6 may be closed so that the node nd10 is connected to the node nd15 during the holding interval (T2 in FIG. 4). The capacitor 13_3 may be connected between the node nd11 and the set voltage VS. The capacitor 13_5 may be connected between the node nd15 and the set voltage VS. Because the second amplifier 15_2 performs the amplification operation, based on the voltage gain A during the holding interval (T2 in FIG. 4), the voltage of the node nd11 may be set to a value obtained by dividing the negative value of a voltage level of the node nd14 by the voltage gain A of the second amplifier 15_2. The voltage difference between the output voltage VOUT of the node nd15 and the voltage of the node nd11 during the holding interval (T2 in FIG. 4) may be set to a voltage difference generated across the capacitor 13_1 during the sampling interval (T1 in FIG. 4). The switches 11_4 and 11_5 and the capacitors 13_1 and 13_2 may be included in the sampling circuit 11 and operate during the sampling interval (T1 in FIG. 4), and may be included in the holding circuit 13 and operate during the holding interval (T2 in FIG. 4).

Figure 2:
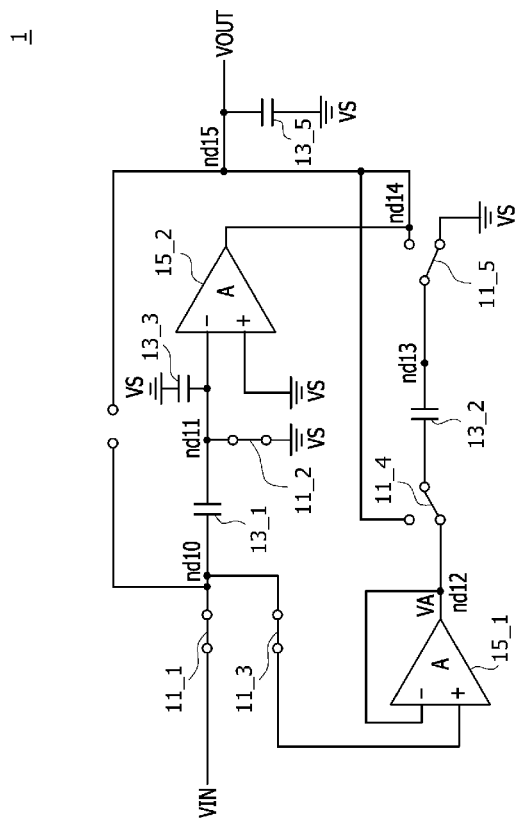
FIG. 2 is a circuit diagram illustrating a sampling operation of a sample and hold circuit according to an embodiment of the present disclosure.
Figure 3:
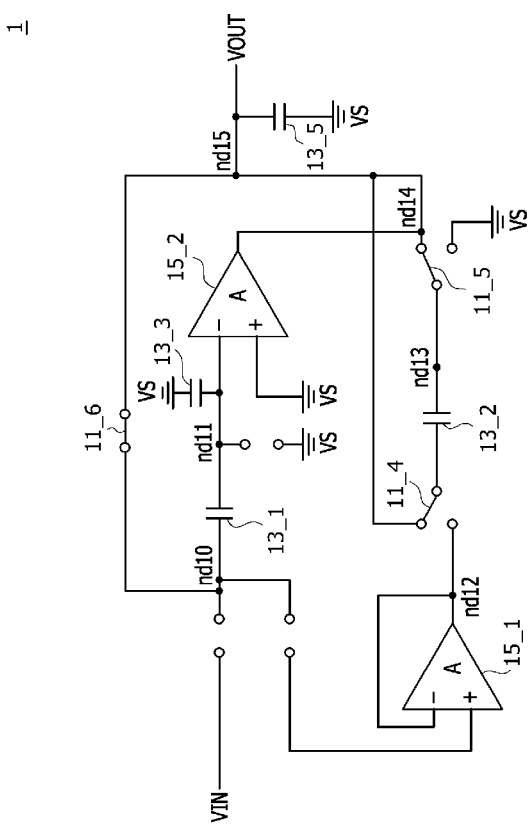
FIG. 3 is a circuit diagram illustrating a holding operation of a sample and hold circuit according to an embodiment of the present disclosure.

FIG. 2 is a circuit diagram illustrating the sampling operation of the sample and hold circuit 1 shown in FIG. 1, and FIG. 3 is a circuit diagram illustrating the holding operation of the sample and hold circuit 1. Referring to FIGS. 2 and 3, assuming that the set voltage VS is set to the ground voltage, the sampling operation and holding operation of the sample and hold circuit 1 will be described as follows.

As shown in FIG. 2, when the switches 11_1 and 11_2 are closed, the input voltage VIN is applied to the node nd10, and the ground voltage is applied to the node nd11 during the sampling interval (T1 in FIG. 4), a voltage difference equal to the input voltage VIN may be generated across the capacitor 13_1. In addition, when the switches 11_3, 11_4, and 11_5 are switched, the input voltage VIN is input to the positive input terminal '+' of the first amplifier 15_1, the node nd12 is connected to the capacitor 13_2, and the node nd13 is set to the ground voltage during the sampling interval (T1 in FIG. 4), a voltage difference equal to the amplification voltage VA may be generated across the capacitor 13_2. Because the amplification voltage VA is a value obtained by dividing the value obtained by subtracting the voltage level of the amplification voltage VA from the voltage level of the input voltage VIN by the voltage gain A, that is, VA=A(VIN−VA), a relation of $$VA = VIN \frac{A}{1+A}$$

may be established.

As shown in FIG. 3, when the switches 11_4 and 11_5 are switched and the node nd14 is connected to the node nd13 during the holding interval (T2 in FIG. 4), the voltage of the node nd14 may be set to a voltage obtained by subtracting the amplification voltage VA from the output voltage VOUT, that is, VOUT−VA. Because the second amplifier 15_2 performs the amplification operation, based on the voltage gain A during the holding interval (T2 in FIG. 4), the voltage of the node nd11 may be set to a value obtained by dividing a negative value of the voltage level of the node nd14 by the voltage gain A of the second amplifier 15_2, that is, $$-\frac{(VOUT - VA)}{A}.$$

During the holding interval (T2 in FIG. 4), because the switch 11_6 is closed and the voltage difference between the output voltage VOUT of the node nd15 and the voltage of the node nd11 is set to a voltage difference generated across the capacitor 13_1 during the sampling interval (T1 in FIG. 4), the relation of $$VOUT + \frac{VOUT - VA}{A} = VIN$$

may be established. When the relational expression of the output voltage VOUT and the input voltage VIN is arranged based on $$VA = VIN \frac{A}{1+A}$$

and $$VOUT + \frac{VOUT - VA}{A} = VIN,$$

it can be arranged as $$\frac{VOUT}{VIN} = \frac{2A + A^2}{1 + 2A + A^2} = 1 - \frac{1}{1 + 2A + A^2}.$$

Here, $$\frac{1}{1 + 2A + A^2}$$

may be defined as an error rate.

FIG. 4 is a waveform diagram illustrating waveforms of the input voltage and the output voltage of the sample and hold circuit 1 of FIG. 1. As shown in FIG. 4, during the sampling interval T1, the amplification voltage VA that is generated by amplifying the input voltage VIN is sampled through the capacitor 13_2, and the voltage V13_2 across the capacitor 13_2 may be generated based on the amplification voltage VA. During the holding interval T2, the output voltage VOUT may be set to the voltage level of the input voltage VIN, based on the amplified voltage VA generated across the capacitor 13_2 during the sampling interval T1. Because the amplification voltage VA is used when the output voltage VOUT is set to the voltage level of the input voltage VIN, the output voltage VOUT may be stably set to the voltage level of the input voltage VIN during the preset holding interval T2.

FIG. 5 is a table illustrating the error rate generated in the sample and hold circuit 1 of FIG. 1.

As shown in FIG. 5, in the case of the prior art, because the sampling operation and the holding operation are performed through one amplifier and the relational expression of the output voltage VOUT and input voltage VIN is defined as $$\frac{VOUT}{VIN} = 1 - \frac{1}{1+A}$$

and the error rate is defined as $$\frac{1}{1+A},$$

the error rate may be set to 9.090909% when the voltage gain A of the amplifier is defined as 10, and the error rate may be set to 0.990099% when the voltage gain A of the amplifier is defined as 100.

On the other hand, in the case of the present disclosure, because the sampling operation is performed by the first amplifier 15_1 and the holding operation is performed by the second amplifier 15_2, and the relational expression of the output voltage VOUT and the input voltage VIN is defined as $$\frac{VOUT}{VIN} = \frac{2A + A^2}{1 + 2A + A^2} = 1 - \frac{1}{1 + 2A + A^2}$$

and the error rate is defined as $$\frac{1}{1 + 2A + A^2},$$

when the voltage gain A of the amplifier is defined as 10, the error rate may be set to 0.826446281%, and when the voltage gain A of the amplifier is defined as 100, the error rate may be set to 0.00980296%.

As described above, in the present disclosure, the sampling operation may be performed by the first amplifier 15_1, and the holding operation may be performed by the second amplifier 15_2. Accordingly, the error rate between the output voltage VOUT and the input voltage VIN can be reduced compared to a case where the sampling operation and the holding operation are performed by the same amplifier.

Concepts have been disclosed in conjunction with some embodiments as described above. Those skilled in the art will appreciate that various modifications, additions, and/or substitutions are possible, without departing from the scope and spirit of the present disclosure. Accordingly, the embodiments disclosed in the present specification should be considered from not a restrictive standpoint but rather from an illustrative standpoint. The scope of the concepts is not limited to the above descriptions but defined by the accompanying claims, and all of distinctive features in the equivalent scope should be construed as being included in the concepts.

What is claimed is:

1. A sample and hold circuit comprising:
    a sampling circuit including a first amplifier configured to amplify an input voltage to generate an amplification voltage, the sampling circuit configured to perform a sampling operation of sampling the amplification voltage; and
    a holding circuit configured to perform a holding operation of setting an output voltage to a voltage level of the input voltage, based on the sampling operation and an amplification operation of a second amplifier,
    wherein the sampling circuit further includes a first capacitor, a first switch that is switched so that the input voltage is applied to an end of the first capacitor during the sampling interval, and a second switch that is switched so that a set voltage is applied to the other end of the first capacitor during the sampling interval, a second capacitor generating a voltage difference between both ends of the second capacitor, based on the amplification voltage during the sampling interval, and a third switch that is switched so that a set voltage is applied to the other end of the second capacitor during the sampling interval.

2. The sample and hold circuit of claim 1, wherein the set voltage is set to a ground voltage.

3. The sample and hold circuit of claim 2, wherein the sampling circuit further includes:
- a first switch that is switched so that the input voltage is applied to an end of the first amplifier during the sampling interval; and
- a second switch that is switched so that an output signal of the first amplifier is applied to an end of the second capacitor during the sampling interval.

4. The sample and hold circuit of claim 1, wherein the holding circuit is configured to set a voltage level of an output signal of the second amplifier to the second capacitor during a holding interval in which the holding operation is performed based on a sampled amplification voltage.

5. The sample and hold circuit of claim 4, wherein the voltage level of the output signal of the second amplifier is set by subtracting a voltage level across the second capacitor from a voltage level of an output voltage.

6. The sample and hold circuit of claim 4, wherein the holding circuit further includes:
- a fourth switch that is switched so that the output signal of the second amplifier is connected to an end of the second capacitor during the holding interval; and
- a fifth switch that is switched so that a node from which the output voltage is output is connected to the other end of the second capacitor during the holding interval.

7. The sample and hold circuit of claim 4, wherein the holding circuit is configured to set the voltage level of the output voltage to the first capacitor, based on a sampled input voltage during the holding interval.

8. A sample and hold circuit comprising:
- a holding circuit including a second amplifier, the holding circuit configured to perform a holding operation of setting an output voltage to a voltage level of an input voltage; and
- a sampling circuit configured to perform a sampling operation, the sampling circuit including:
  - a first amplifier generating an amplification voltage by amplifying the input voltage;
  - a first capacitor generating a voltage difference between both ends of the first capacitor, based on the input voltage and a set voltage during a sampling interval in which the sampling operation is performed; and
  - a second capacitor generating a voltage difference between both ends of the second capacitor, based on the amplification voltage and the set voltage during the sampling interval,
- wherein the sampling circuit further includes a first switch that is switched so that the input voltage is applied to an end of the first capacitor during the sampling interval, a second switch that is switched so that the set voltage is applied to the other end of the first capacitor during the sampling interval and a third switch that is switched so that the set voltage is applied to the other end of the second capacitor during the sampling interval.

9. The sample and hold circuit of claim 8, wherein the sampling circuit further includes:
- a fourth switch that is switched so that the input voltage is applied to an end of the first amplifier during the sampling interval; and
- a fifth switch that is switched so that an output signal of the first amplifier is applied to an end of the second capacitor during the sampling interval.

10. The sample and hold circuit of claim 8, wherein the holding circuit is configured to set a voltage level of an output signal of the second amplifier, based on a sampled amplification voltage to the second capacitor during a holding interval in which the holding operation is performed.

11. The sample and hold circuit of claim 10, wherein the voltage level of the output signal of the second amplifier is set by subtracting a voltage level across the second capacitor from a voltage level of the output voltage.

12. The sample and hold circuit of claim 10, wherein the holding circuit further includes:
- a fourth switch that is switched so that the output signal is connected to an end of the second capacitor during the holding interval; and
- a fifth switch that is switched so that a node from which the output voltage is output is connected to the other end of the second capacitor during the holding interval.

13. The sample and hold circuit of claim 10, wherein the holding circuit is configured to set the voltage level of the output voltage to the first capacitor, based on a sampled input voltage during the holding interval.

* * * * *